United States Patent [19]
Tseng

[11] Patent Number: 5,608,483
[45] Date of Patent: Mar. 4, 1997

[54] LOW-POSITION VIEWFINDER CAMERA

[76] Inventor: Hong L. Tseng, 505 S. Beverly Dr. #1127, Beverly Hills, Calif. 90212

[21] Appl. No.: 539,582

[22] Filed: Oct. 5, 1995

[51] Int. Cl.[6] .................................................. G03B 13/02
[52] U.S. Cl. .............................................................. 396/373
[58] Field of Search ..................................... 354/219, 223, 354/288

[56] References Cited

U.S. PATENT DOCUMENTS

| | | | |
|---|---|---|---|
| 3,800,309 | 3/1974 | Land | 354/152 |
| 4,980,708 | 12/1990 | Leonard | 354/82 |
| 5,122,827 | 6/1992 | Saegusa et al. | 354/410 |

*Primary Examiner*—Safet Metjahic
*Assistant Examiner*—John Chizmar
*Attorney, Agent, or Firm*—Christensen O'Connor Johnson & Kindness PLLC

[57] ABSTRACT

Disclosed is an improvement on the placement of the viewfinder on compact cameras. The improvement allows the camera back not to press against the photographer's nose when the photographer is viewing through the viewfinder to take pictures. The improvement comprises a placement of the viewfinder at a position near the bottom of the camera. The viewfinder position allows the photographer to see through the viewfinder without letting the camera back press against the photographer's nose. In preferred embodiments, the viewfinder can be placed at the bottom-left corner of the camera body, beneath the lens at the center, or at the bottom-right corner of the camera body. In addition, the camera body can be provided with a recessed portion on the bottom that allows the photographer's nose to be placed therewithin when the photographer is viewing through the viewfinder, thus further allowing comfortableness to the photographer's nose when the photographer is viewing through the viewfinder.

8 Claims, 6 Drawing Sheets

LOW-POSITION VIEWFINDER CAMERA

BACKGROUND OF THE INVENTION

The present invention relates to photographic devices, and more particularly to an improvement on the placement of the viewfinder on a camera.

Cameras are popular photographic devices that allow people to capture the images of their daily life. Usually, most types of cameras are provided with a lens for capturing image on film, a shutter release for releasing the shutter, a display for displaying camera data as frame number and aperture and shutter speed settings, a view finder for the photographer to view what will be captured on film, and a flash unit 16 take pictures in dim-lighted situation.

On most conventional cameras, the lens is provided at the center of the camera body and the viewfinder is either provided above the lens or at the upper-left corner of the camera body. It is therefore a drawback arising from such a provision that, when the photographer's eye is placed near the viewfinder to view the image to be captured on film, the back of the camera body could press against the photographer's nose. This causes several disadvantages to the use of the camera. First, when the photographer tries to get his/her eye closer to the viewfinder to see the image more entirely, the pressure of the camera back against the nose could cause uncomfortableness to the photographer. Second, the breath of the photographer through the nose would cast moisture on the camera back and therefore the camera back would easily get tainted.

Furthermore, since most compact cameras are designed to be hand held for the taking of pictures, they must be held very steadily in the hands of the photographer so as to avoid possible image blurs due to camera shake. Therefore, there exists a need for provisions on compact cameras that help the photographer to stabilize the compact camera when handheld in taking pictures.

SUMMARY OF THE INVENTION

It is therefore the primary objective of the present invention to provide an improvement to a camera that allows the camera back not to press against the photographer's nose when the photographer is viewing through the viewfinder to take pictures.

It is another objective of the present invention to provide an improvement to a camera that allows the photographer's eye to get closer to the viewfinder so as to view more entirety of the viewfinder image.

It is still another objective of the present invention to provide an improvement to a camera that can help the photographer to avoid letting the camera back press against his/her nose so that the camera can be handheld more steadily to reduce the possibility of blurred images due to camera shake.

In accordance with the foregoing and other objectives of the present invention, there is provided with an improved camera that is substantially rectangular. The improvement comprises a placement of the viewfinder at a position near the bottom of the camera that is spaced from a top surface of 16 camera when the camera is oriented for horizontal format picture taking. The viewfinder position allows the photographer to see through the viewfinder without letting the camera back press against the photographer's nose. In various preferred embodiments, the viewfinder can be placed at the bottom-left corner of the camera body, beneath the lens at the center, or at the bottom-right corner of the camera body.

By way of the improvement, the photographer can view through the viewfinder without letting the camera back press against his/her nose. Moreover, since the breath through the photographer's nose is not exhaled onto the camera back when taking pictures, the camera back can always be kept dry and clean.

In addition, the camera body can be formed with a recessed portion on the bottom to further avoid the pressure that the camera back exerts against the photographer's nose. The provision of the recessed portion allows the photographer's nose to be placed therewithin when the photographer's eye is viewing through the viewfinder, thus further allowing comfortableness to the photographer's nose when taking pictures.

BRIEF DESCRIPTION OF DRAWINGS

The present invention can be better understood by reading the subsequent detailed description of the preferred embodiments thereof with references made to the accompanying drawings, wherein.

DETAILED DESCRIPTION OF PREFERRED EMBODIMENT

FIGS. 1–6 show preferred embodiments of a camera of the present invention. As can be seen from FIGS. 1–6, a camera 1 is preferably a compact camera. FIGS. 1–6 show that compact camera 1 preferably has a substantially rectangular camera body. FIGS. 1–6 show compact camera 1 oriented for horizontal picture taking, as is well known.

Figure 1:
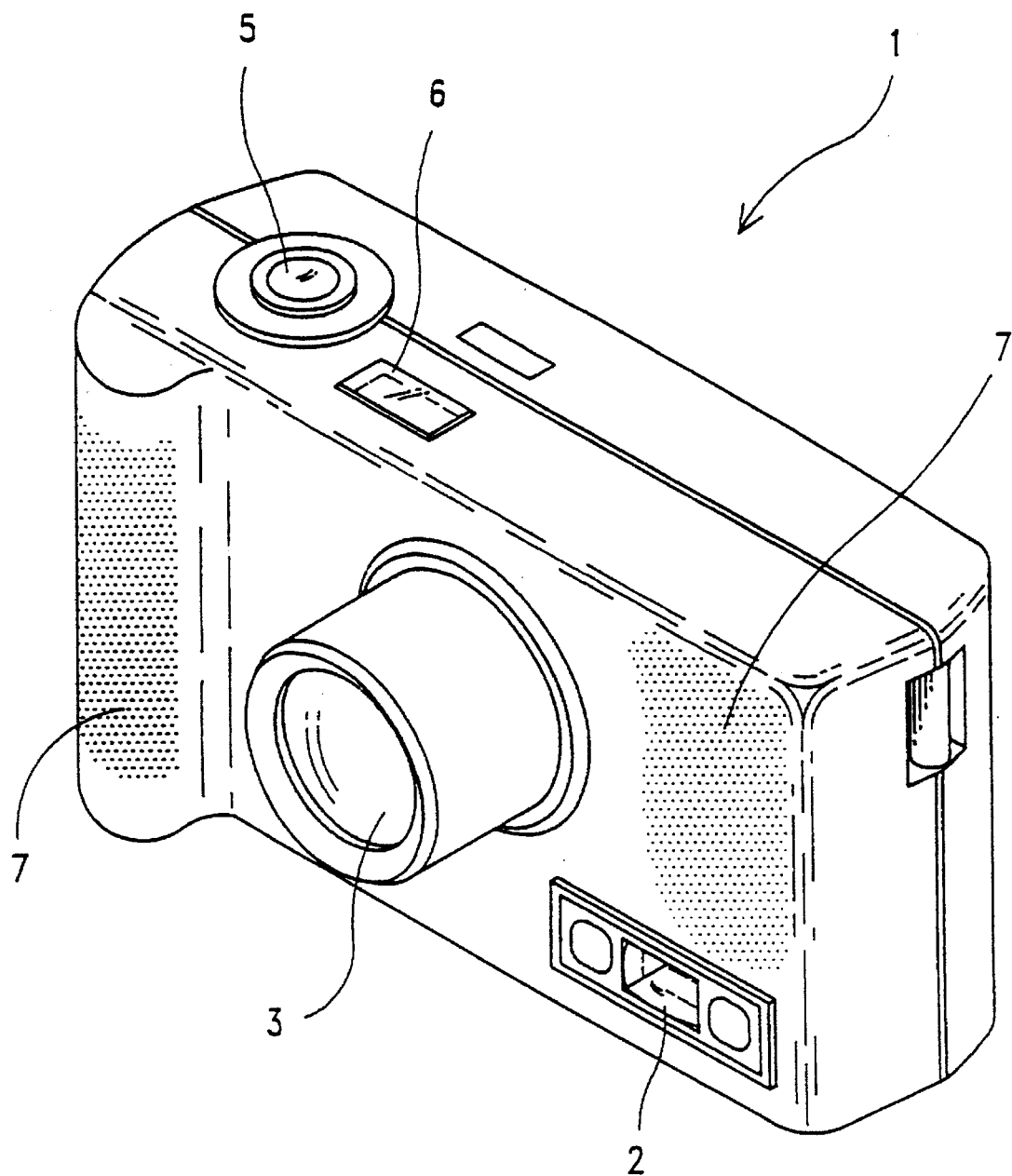
FIG. 1 shows the first preferred embodiment of the present invention.

FIG. 1 shows a compact camera 1 employing the improvement according to the present invention. Like conventional compact cameras, the one shown here includes a lens 3 for capturing image on film, a shutter release 5, a display 6 for showing camera data as frame number, aperture and shutter speed settings. Rugged surfaces 7 are formed on the camera body so as to facilitate a firm grip of the camera body by hand. It is a characteristic feature of the compact camera of FIG. 1 that its viewfinder 2 is provided at the bottom-left corner of the camera body.

Figure 2:
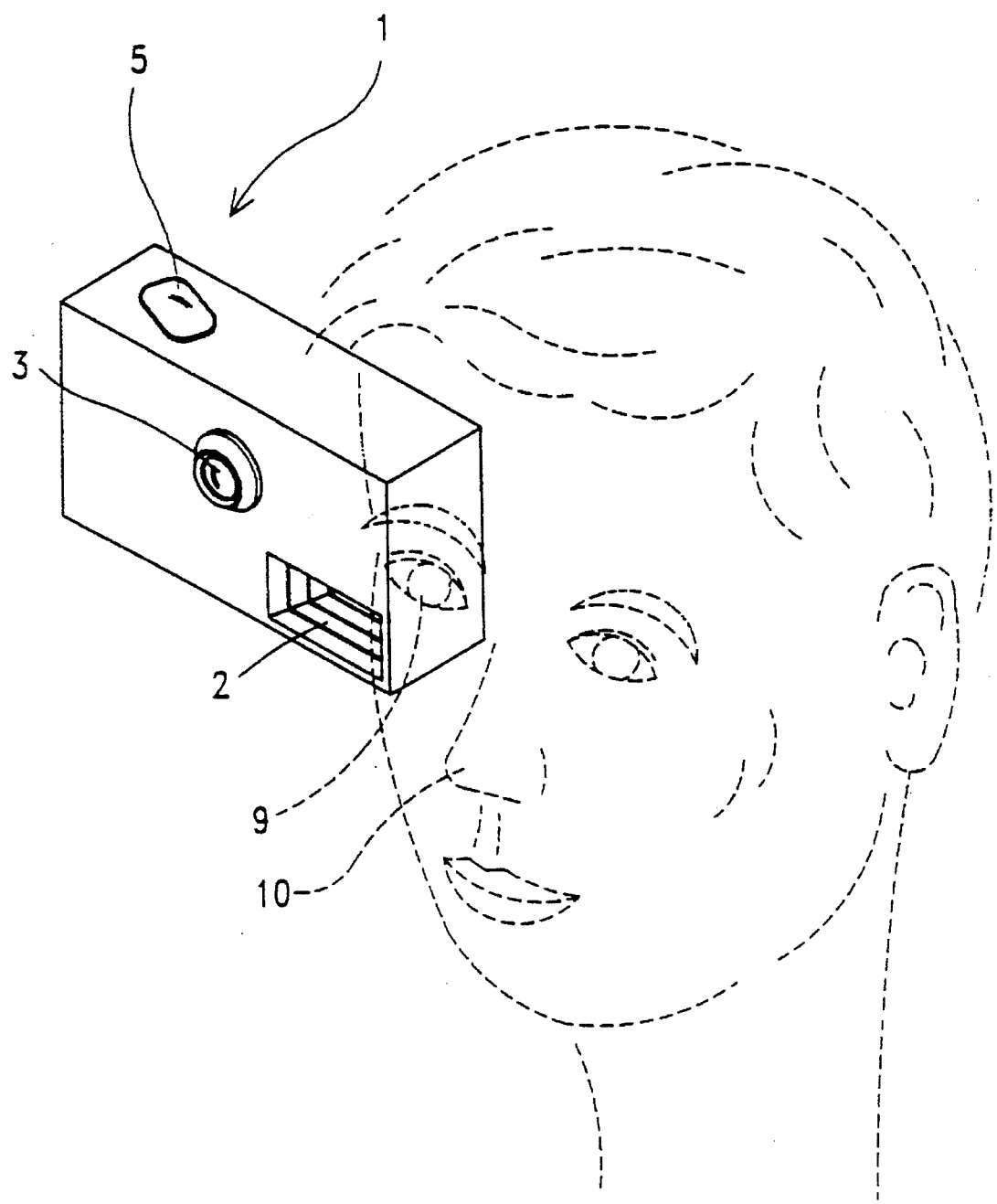
FIG. 2 shows the second preferred embodiment of the present invention.

FIG. 2 shows a photographer using a compact camera also employing the improvement according to the present invention. As clearly depicted in the drawing, when the photographer's eye 9 is viewing through the viewfinder 2, the photographer's nose 10 is a distance away from the camera body. In this way, the photographer could have his / her eye 9 closer to the viewfinder 2 so as to see the entirety of the image in the viewfinder without letting the camera back press against the nose 10. Moreover, the photographer's breath through the nose would not cast moist on the camera back, therefore the camera body could be kept dry and clean during the time when the photographer takes pictures.

Figure 3:
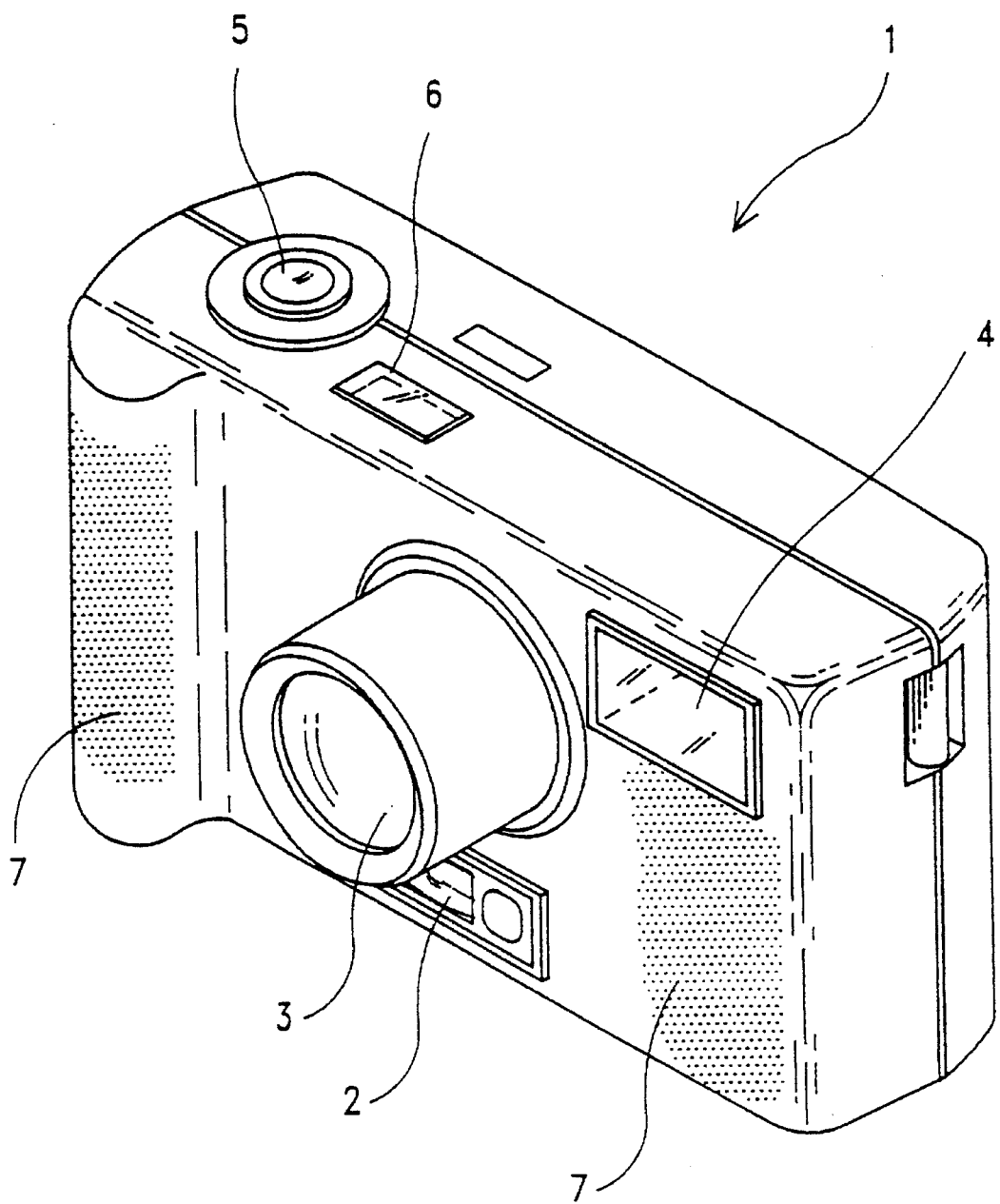
FIG. 3 shows the third preferred embodiment of the present invention.

The position of the viewfinder need not be limited to the bottom-left corner of the camera body as that shown in FIG. 1 and FIG. 2. As illustrated in FIG. 3 (which shows a compact camera of the same type as the one shown in FIG. 1 except for the provision of a built-in flash unit 4 at the upper-left corner for use in dim light situations), the viewfinder 2 can also be provided beneath the lens 3 at the center of the camera body. This provision also prevent the camera back from pressing against the photographer's nose when the photographer's eye is viewing through the viewfinder 2.

Figure 4:
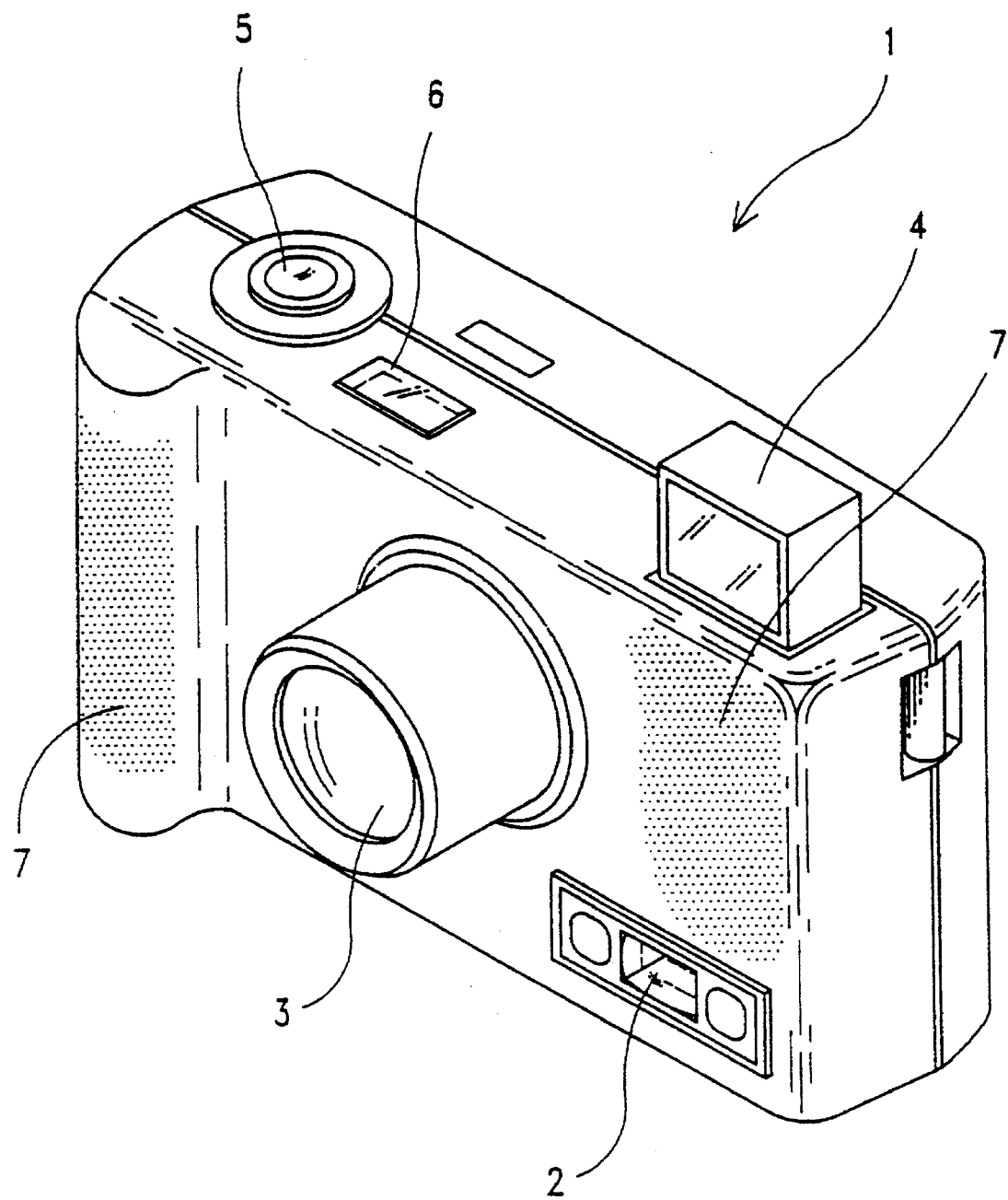
FIG. 4 shows the fourth preferred embodiment of the present invention.

FIG. 4 further shows the fourth preferred embodiment of the improvement according to the present invention on another type of compact camera which has a retractable built-in flash unit 4. On this compact camera, the viewfinder 2 is provided at the bottom-left corner of the camera body.

Figure 5:
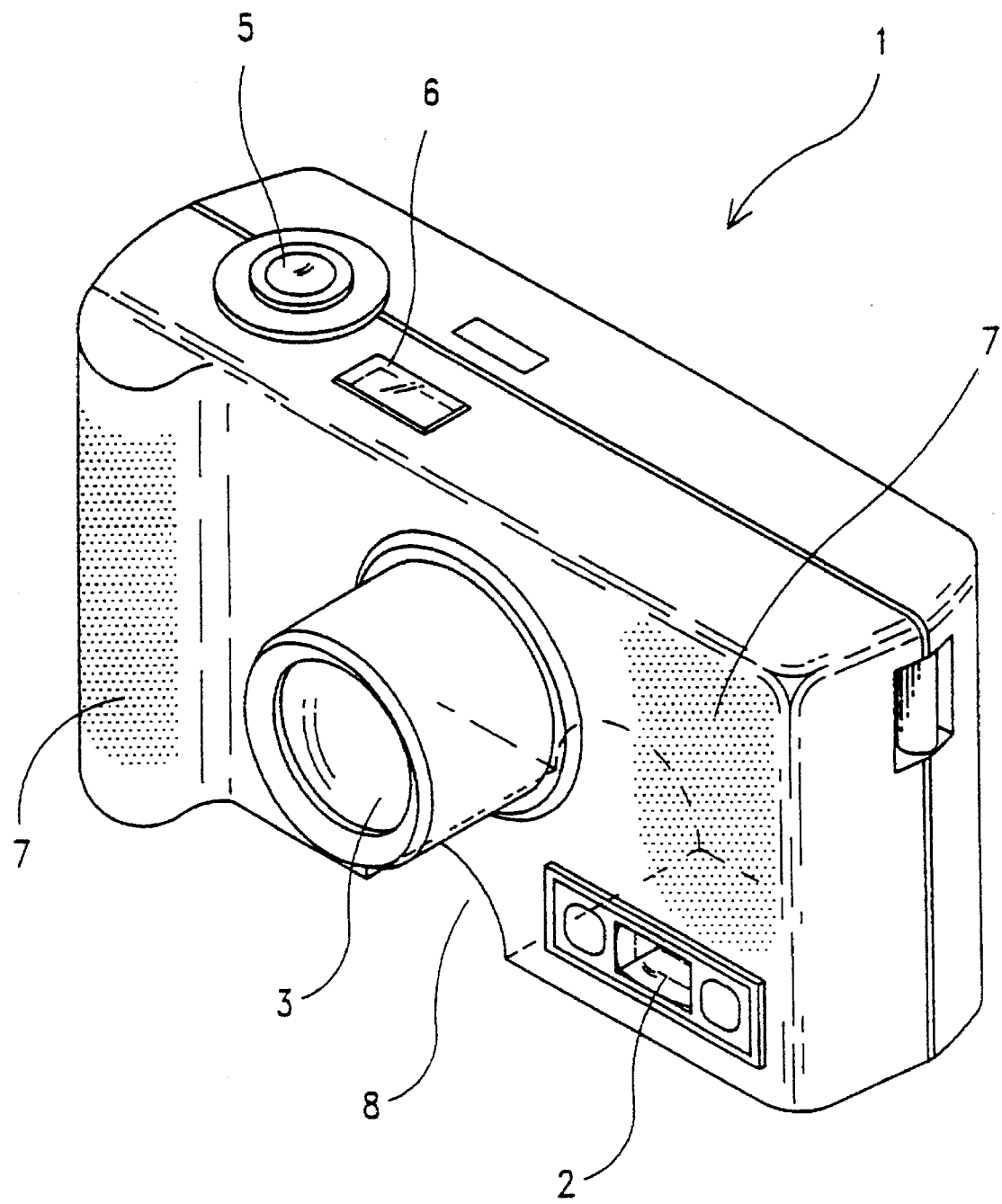
FIG. 5 shows the fifth preferred embodiment of the present invention.

FIG. 5 shows the fifth preferred embodiment of the improvement according to the present invention. On this embodiment, the viewfinder 2 is placed at the bottom-left corner of the camera body. Furthermore, it is another important aspect of the present invention that a recessed portion 8 is formed on the bottom of the camera body. The provision of the recessed portion 8 allows the photographer's nose to be placed therewithin, thus further allowing comfortableness to the photographer's nose when the photographer is viewing through the viewfinder 2.

Figure 6:
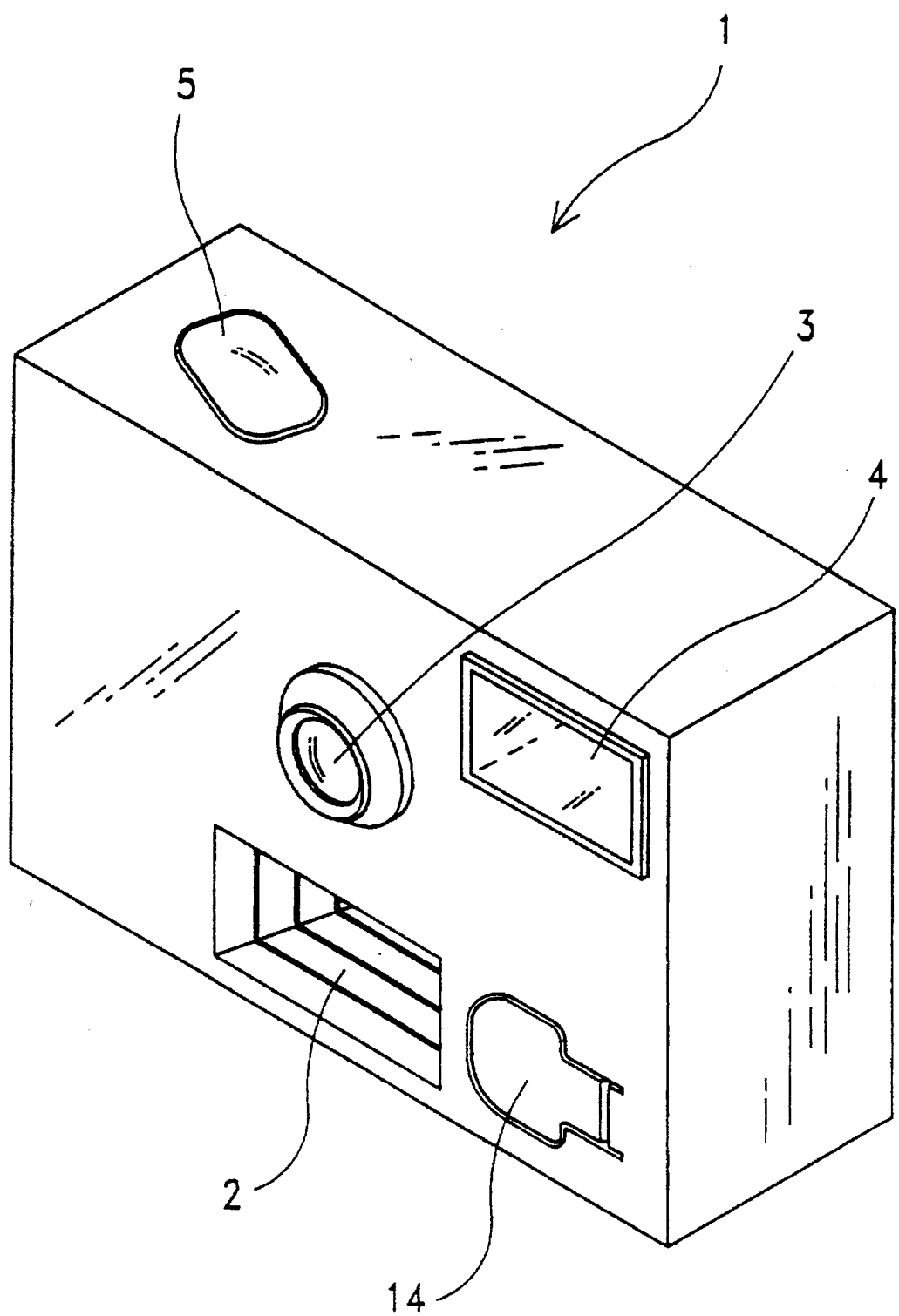
FIG. 6 shows the sixth preferred embodiment of the present invention.

FIG. 6 shows the sixth preferred embodiment of the improvement according to the present invention on a disposable compact camera which can be used only once and then is thrown away after the roll of film is used up. This disposable compact camera comes with a built-in flash unit 4 at the upper-left corner and a flash button 14 at the bottom-left corner for use in dim light situations. The viewfinder 2 on this camera is provided beneath the lens 3 at the center of the camera body.

In the foregoing embodiments, the viewfinder is either placed at the bottom-left corner of the camera body or beneath the lens at the center. However, broadly speaking, the viewfinder can be placed at any position near the bottom where the photographer can see through the viewfinder without letting the camera back press against the photographer's nose.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A camera comprising:
    a camera body, said camera body being substantially rectangular;
    a lens, provided on said camera body, for capturing an image on film; and
    a viewfinder for viewing the image to be captured through said lens on film, said viewfinder being located at a position near a bottom surface of the camera and spaced from a top surface of the camera when the camera is oriented for horizontal format picture taking for viewing through said viewfinder without said camera body pressing against a photographer's nose.

2. A camera as claimed in claim 1, wherein said viewfinder is located at a bottom-left corner of said camera body when the camera is oriented for horizontal format picture taking.

3. A camera as claimed in claim 1, wherein said viewfinder is located beneath said lens when the camera is oriented for horizontal format picture taking.

4. A camera as claimed in claim 1, wherein said viewfinder is located at the bottom-fight corner of said camera body when the camera is oriented for horizontal format picture taking.

5. A camera, comprising:
    a camera body, said camera body being substantially rectangular and having a bottom surface defining a recessed portion;
    a lens, provided on said camera body, for capturing an image on film; and
    a viewfinder for viewing the image to be captured through said lens on film, said viewfinder being located at a position near the bottom surface of the camera and spaced from a top surface of the camera when the camera is oriented for horizontal format picture taking for accommodating a photographer's nose within the recessed portion in the bottom surface of the camera.

6. A camera as claimed in claim 5, wherein said viewfinder is located at the bottom-left corner of said camera body when the camera is oriented for horizontal format picture taking.

7. A camera as claimed in claim 5, wherein said viewfinder is located beneath said lens when the camera is oriented for horizontal format picture taking.

8. A camera as claimed in claim 5, wherein said viewfinder is located at the bottom-fight corner of said camera body when the camera is oriented for horizontal format picture taking.

* * * * *